C. E. PEABODY.
ARMORED TIRE.
APPLICATION FILED JULY 2, 1915.

1,235,156.

Patented July 31, 1917.

WITNESS
Edward A. Breed

INVENTOR,
Charles E. Peabody.
BY
Allen & Daggett,
ATTORNEYS.

UNITED STATES PATENT OFFICE.

CHARLES E. PEABODY, OF BROOKS, MAINE.

ARMORED TIRE.

1,235,156.  Specification of Letters Patent.  Patented July 31, 1917.

Application filed July 2, 1915. Serial No. 37,758.

*To all whom it may concern:*

Be it known that I, CHARLES E. PEABODY, a citizen of the United States, residing at Brooks, in the county of Waldo, in the State of Maine, have invented a certain new and useful Improvement in Armored Tires, of which the following is a specification, reference being had to the accompanying drawings.

Figure 1:
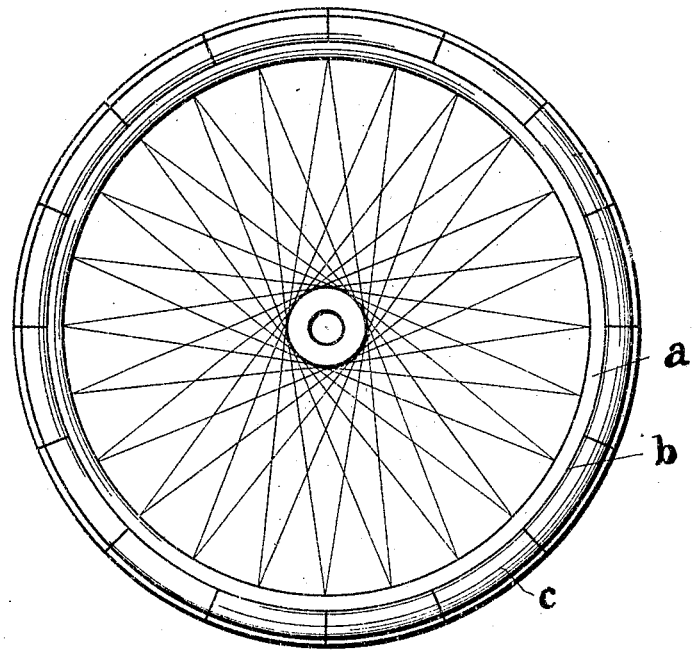

The object of this invention is to provide a pneumatic tire, for use with trucks, and the like heavy vehicles, which tire will include a protective armor of metal formed of a plurality of articulated sections which will effectually prevent the puncturing of the pneumatic tire without destroying its resiliency, my said improved tire being illustrated in the annexed drawings in which Figure 1 is a side view of a wheel-rim having mounted thereon an armored tire embodying my said improvement.

Figure 3:
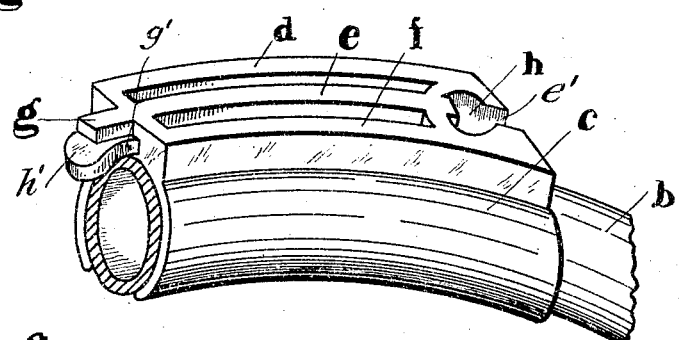
Figure 2:
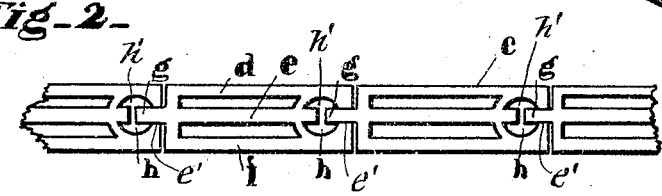

Fig. 2 is a development of a portion of the said tire and Fig. 3 is a relatively enlarged, perspective view of one of the armor sections.

Referring to these drawings, the letter *a* indicates the wheel rim and *b* denotes a pneumatic tire of any approved construction mounted on the said rim. My protective armor is constructed of a plurality of metallic sections *c*, each formed as a segment of a circle of the same radius as the tire *b*, and each being open at its inner portion, so that it may be readily slipped onto the resilient tire *b*, as seen in Fig. 3. The outer portion of the said armor is formed with an extension which includes longitudinal ribs, *d*, *e* and *f* and provides a flat tread. Projecting from one end of the said extension is an approximately rectangular dowel *g* and at the other end of said extension is an approximately circular-shaped socket *h*; the arrangement and location of the dowels and sockets being such that, when the several armor sections *c* are mounted on the tire *b*, the dowel of each armor section will enter the socket of the next abutting section, thus providing a continuous protective jacket of metal around the tire, the doweled joints however being so loosely fitted that they are in effect articulated and permit the armor sections to yield with respect to each other under heavy loads. Each extension is further provided at each end and immediately below the dowel *g* with a neck *g'* which terminates in a rounded head *h'*. The necks *g'* are adapted to engage in throats *e'* which lead to the sockets *h*. The heads prevent longitudinal disengagement of the sections while the dowels prevent lateral swinging movement.

The ribs *d—e* and *f* and the intervening channels serve to prevent the tire from skidding objectionably.

Having a protective armor of my described construction it is impossible to puncture the pneumatic tire, yet the desirable resilient quality of said tire is available in a large degree.

Having thus described my invention, I claim as new and wish to secure by Letters Patent:—

An armor for tires comprising a plurality of sections for engaging the tire, extensions formed on the sections and having one of their ends provided with recesses having throats communicating therewith, the other ends of said extensions having dowels carried thereby, heads disposed below the dowels having necks integrally connected to the extensions, said necks and dowels being adapted to engage the throats of the recesses of an adjacent extension when the heads are engaged in the recesses thereof.

CHARLES E. PEABODY.

Copies of this patent may be obtained for five cents each, by addressing the "Commissioner of Patents, Washington, D. C."